Patented Apr. 15, 1930

1,754,481

UNITED STATES PATENT OFFICE

GILBERT MICHEL, OF BAGNEUX, FRANCE

PROCESS FOR PROTECTING EASILY-OXIDIZABLE METALS SUCH AS THOSE HAVING A BASE OF MAGNESIUM, ALUMINUM, CALCIUM, ETC.

No Drawing. Application filed March 8, 1928, Serial No. 260,256, and in France March 12, 1927.

This invention relates to improvements in or modifications of the invention claimed in my prior U. S. application 50,140 filed August 13, 1925.

In this prior specification, a process for protecting easily oxidizable metals such as magnesium, calcium and alloys thereof, was described consisting essentially in coating the metal article with a layer of phenol or a layer of a substance containing phenol in the free state, and in the said specification mention was made in particular of the possibility of employing coating materials containing a phenol in the place of phenol alone.

The object of the present invention is to provide an improvement in this process, which improvement consists in forming a special coating material for easily oxidizable metals such as magnesium, this coating material having a base formed of substances such as lacs or varnishes prepared from synthetic resin.

It has previously been proposed to make use of coating materials or lacs having a bakelite base, for protecting oxidizable metals, this coating material forming the protecting layer by itself alone.

But in coating materials of this kind the phenol would not intervene in the free state in order to produce a protecting layer or film, but the phenol has reacted chemically with formaldehyde to produce a complex substance which is the synthetic resin itself and neither the phenol nor the resin has any chemical action upon the metal.

On this account the production of a protecting and strongly adherent film of magnesium phenate or the like was not possible.

According to the present invention a complete protection of metal articles such as magnesium may be obtained by adding more or less of free phenol to a lac or varnish, and in particular to one such having a base of synthetic resin prepared by the usual means.

The said solution forms a coating material which may be spread over the surface of the article and the free phenol therein, attacks the metal and produces a protecting layer of crust.

According to the nature of the varnish or the lac employed, the varnish may then, if it is desirable, be dried or cooked by the processes usually employed for this purpose.

A modification of the process, within the scope of the present invention, consists in varying the usual conditions of preparation of the varnishes having a base of synthetic resin, from formol and a phenol (cresol, etc.) by allowing a sufficient excess of free phenol to remain for the metal to be attacked immediately when it is covered with the substance thus obtained.

I claim:—

1. A process for protecting an easily oxidizable alkaline earth metal, consisting in coating this metal with a varnish mixture having a base of synthetic resin and phenol in the free state.

2. A process for protecting an easily oxidizable alkaline earth metal according to claim 1, wherein the varnish having a synthetic resin base is prepared from formol and a phenolic body, a sufficient excess of free phenolic body being allowed to remain which immediately attacks the metal when the metal to be protected is coated with the varnish obtained.

3. A process of protecting a magnesium article which comprises coating the same with a varnish composition containing a free phenol which will react with the surface of the metal, and a soluble phenol-aldehyde condensation product which is of resinous consistency.

4. A magnesium article having a coating on its surface, said coating containing a product from the reaction of a phenolic body with a magnesium surface and containing a phenol resin.

GILBERT MICHEL.